United States Patent [19]

Toshikuni et al.

[11] Patent Number: 4,723,622
[45] Date of Patent: Feb. 9, 1988

[54] WHEEL DRIVE MODE CHANGEOVER APPARATUS

[75] Inventors: Nobuyuki Toshikuni, Neyagawa; Kiyoshi Maeike, Osaka; Ryozo Imanishi, Kishiwada; Hisakatsu Yasumiya, Osaka; Kenji Kondo, Sakai, all of Japan

[73] Assignee: Kubota, Ltd., Osaka, Japan

[21] Appl. No.: 853,715

[22] Filed: Apr. 18, 1986

[30] Foreign Application Priority Data

Oct. 12, 1985 [JP] Japan ................. 60-227525
Dec. 10, 1985 [JP] Japan ................. 60-278584
Dec. 16, 1985 [JP] Japan ................. 60-283818
Dec. 16, 1985 [JP] Japan ................. 60-283817
Feb. 19, 1986 [JP] Japan ................ 61-23644[U]

[51] Int. Cl.⁴ .......................................... B60K 17/34
[52] U.S. Cl. ............................ 180/233; 74/710; 74/710.5; 74/711; 180/248; 192/48.5; 192/48.91
[58] Field of Search ............... 180/233, 248, 249, 250, 180/75.1, 900, 197, 247; 74/710, 710.5, 711; 192/48.5, 48.91

[56] References Cited

U.S. PATENT DOCUMENTS 4,420,059 12/1983 Suzuki .................. 180/249 X
4,484,653 11/1984 Horikoshi et al. ........... 180/233
4,508,190 4/1985 Uchiyama ............... 180/75.1 X
4,574,910 3/1986 Miki et al. ................. 180/900
4,591,177 5/1986 Perlini ...................... 280/91
4,605,087 8/1986 Ashauer et al. ............. 180/248

FOREIGN PATENT DOCUMENTS

189176 7/1986 European Pat. Off. ......... 180/233
63524 4/1983 Japan ....................... 180/248
63525 4/1983 Japan ....................... 180/248
136521 8/1983 Japan ....................... 180/248

*Primary Examiner*—John J. Love
*Assistant Examiner*—Mitchell J. Hill
*Attorney, Agent, or Firm*—Cushman, Darby & Cushman

[57] ABSTRACT

A wheel drive mode changeover apparatus designed to effect a changeover between (a) a two wheel drive mode having only rear wheels driven, (b) a first four wheel drive mode having front wheels and the rear wheels driven at a substantially equal peripheral speed, and (c) a second four wheel drive mode with the front wheels driven at a higher peripheral speed than the rear wheels. The wheel drive mode changeover apparatus includes a control rod for manually switching between the mode (a) and the mode (b) above. By assuming one position this control rod allows the wheel drive mode changeover apparatus to effect the changeover between the mode (b) and the mode (c) in accordance with a traveling condition of a vehicle.

7 Claims, 13 Drawing Figures

WHEEL DRIVE MODE CHANGEOVER APPARATUS

BACKGROUND OF THE INVENTION

The present invention relates to a wheel drive mode changeover apparatus for an agricultural tractor, and more particularly to an apparatus for permitting changeover between a two wheel drive mode and a four wheel drive mode to be effected according to traveling conditions of the tractor such as a sudden sharp turn, a small turn and bad road conditions.

The above apparatus provided for a four wheel drive vehicle is well known, which permits the change-over between the two wheel drive mode and the four wheel drive mode to be effected manually or automatically according to road conditions. One such example is disclosed in U.S. Pat. No. 4,484,653.

An apparatus for use in a four wheel drive vehicle for permitting changeover between a front wheel accelerating four wheel drive mode having front wheels driven at a higher peripheral speed than rear wheels and a standard four wheel drive mode having the front and rear wheels driven at a substantially equal peripheral speed is known, for example, from a Japanese patent application laid open under No. 176121/84 (the corresponding UK application being published under No. GB 2136784A) and from U.S. Pat. No. 4,574,910. In this type of wheel drive mode changeover apparatus, the wheel drive mode changeover is effected in response to detection of a steering angle or of braking of a right rear wheel or left rear wheel. The traveling conditions and the wheel drive modes are in one-to-one relations where, as in the above construction, the wheel drive modes are changed in response to detection of an amount of displacement of a control device for varying the traveling conditions of the vehicle, such as a steering wheel or a side brake pedal, that is to say where the wheel drive modes are changed according to changes in the traveling conditions of the vehicle. Therefore, a desired wheel drive mode cannot be selected under cetain traveling conditions at will, and a certain wheel drive mode cannot be retained against changes in the traveling conditions.

The four wheel drive mode having the front wheels accelerated is used when a small turn is necessary or when making a sudden sharp turn to avert a danger just ahead. For a normal agricultural operation or traveling the four wheel drive mode having the front and rear wheels driven at a substantially equal peripheral speed or the two wheel drive mode is used. Therefore, to establish the one-to-one relations between these drive modes and the traveling conditions does not provide for but rather deviates from the optimal use of these three drive modes.

SUMMARY OF THE INVENTION

The object of the present invention is to provide a wheel drive mode changeover apparatus having a great degree of freedom in switching between a two wheel drive mode, a four wheel drive mode with the front and rear wheels driven at a substantially equal peripheral speed, and a four wheel drive mode with the front wheels driven at a higher peripheral speed than the rear wheels.

To accomplish the above object and other equally important objects, in accordance with the invention there is provided a wheel drive mode changeover apparatus comprising first wheels and second wheels driven by an engine; transmission means for effecting changeover between (a) a two wheel drive mode having only the second wheels driven, (b) a first four wheel drive mode having the first wheels and the second wheels driven at a substantially equal peripheral speed, and (c) a second four wheel drive mode with the first wheels driven at a higher peripheral speed than the second wheels; traveling condition detecting means; a first control means responsive to an output of the traveling condition detecting means for actuating the transmission means, the first control means being adapted to switch between the first four wheel drive mode and the second four wheel drive mode; and a second control means for establishing and breaking operative connection between the transmission means and the first control means.

This wheel drive mode changeover apparatus permits the vehicle to travel by a wheel drive mode according to traveling conditions, and the response to the traveling conditions to be broken for a time to retain a desired drive mode such as the four wheel drive mode having the front and rear wheels driven at a substantially equal peripheral speed.

The degree of freedom in the wheel drive mode changeover operation may be increased further by providing the second control means with a function to switch between the two wheel drive mode and the four wheel drive mode having the front and rear wheels driven at a substantially equal peripheral speed, in addition to the function to establish and break operative connection between the transmission means and the first control means.

DESCRIPTION OF THE PREFERRED EMBODIMENT

The invention as embodied in an agricultural tractor will be described hereinafter with reference to the drawings.

Figure 1:
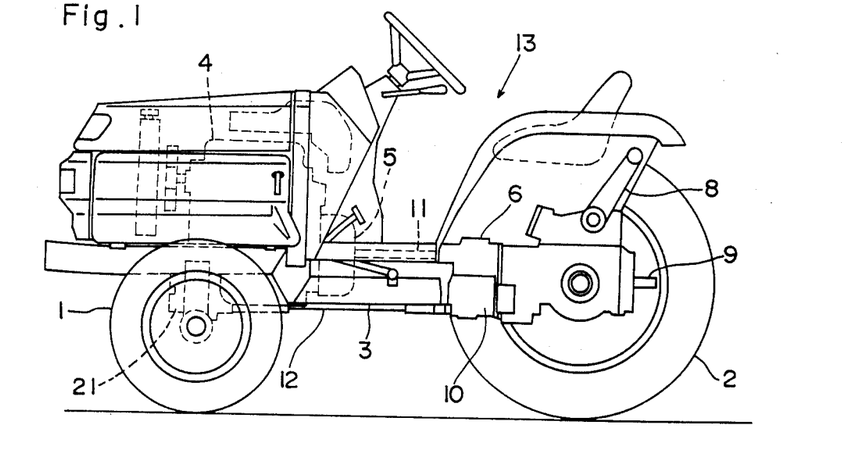
FIG. 1 is a side elevation of an agricultural tractor including a wheel drive mode changeover apparatus embodying the present invention.

FIG. 1 shows a four wheel drive agricultural tractor having right and left dirigible front drive wheels 1 and right and left rear wheels 2 supported by a chassis 3 carrying an engine 4, a main clutch 5, a transmission case 6 and a driver's section 7. The tractor includes at a rear end thereof a vertically oscillatable lift arm 8 to which a rotary plow or other working implement is connected, and a power takeoff shaft 9 for transmitting power to the working implement.

Figure 2:
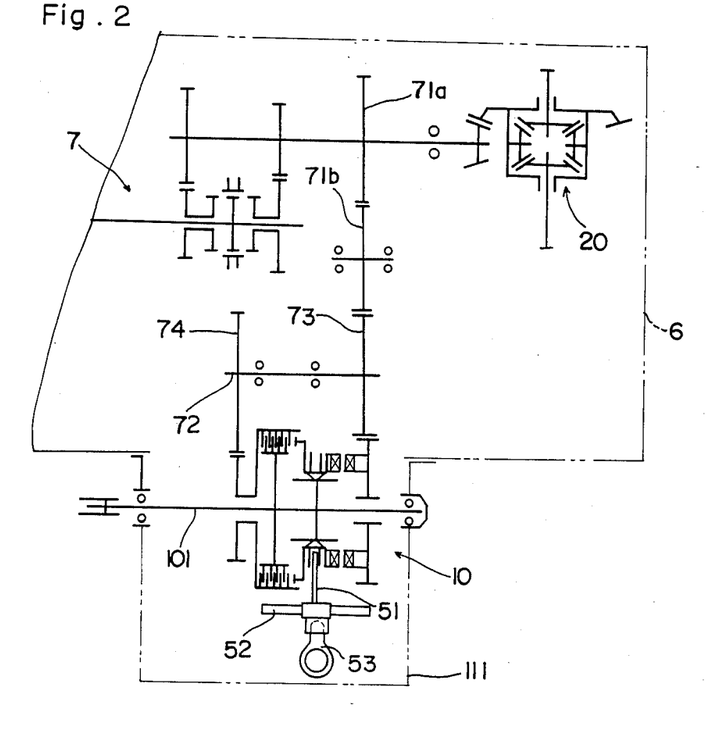
FIG. 2 is a schematic plan view of a portion of transmission including a front wheel change speed mechanism and an auxiliary change speed mechanism.

This agricultural tractor has a power transmission system and a front wheel change speed mechanism 10 as illustrated in FIGS. 1 and 2. The power of the engine 4 is transmitted through the main clutch 5, a power transmission shaft 11 to a main change speed mechanism (not shown) and to an auxiliary change speed mechanism 7 where the power is changed to varied speeds. The output of the auxiliary change speed mechanism 7 is transmitted through an output shaft 70 to a rear differential mechanism 20. Part of this output is taken from the output shaft 70 through gears 71a and 71b to be transmitted to the front wheel change speed mechanism 10 which is operable to effect wheel drive mode switching. The output of the front wheel change speed mechanism 10 is transmitted through a front wheel drive intermediate shaft 12 to a front differential mechanism 21.

Figure 3:
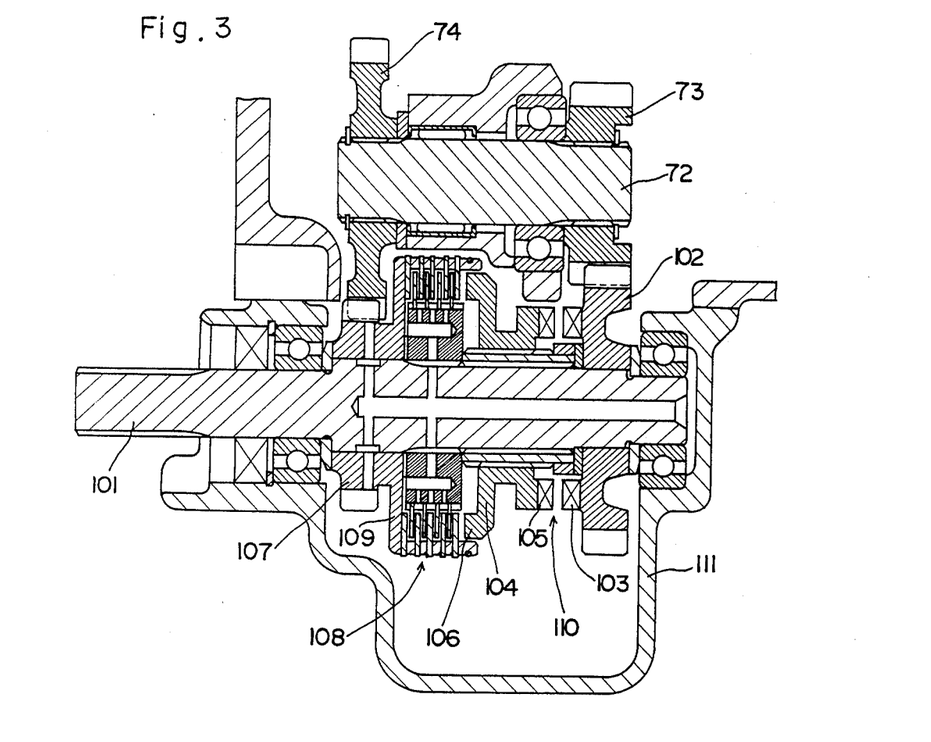
FIG. 3 is a side view of the front wheel change speed mechanism.

The front wheel change speed mechanism 10 will be described next. As shown in FIGS. 2 and 3, an intermediate transmission shaft 72 is disposed in a region of the auxiliary change speed mechanism 7 inside the transmission case 6. The intermediate transmission shaft 72 carries a first output gear 73 fixed to one end thereof and a second output gear 74 fixed to the other end thereof. The first output gear 73 is in mesh with the gear 71b constituting part of the mechanism for taking out the power from the auxiliary change speed mechanism 7. A first driven gear 102 in mesh with the first output gear 73 is freely rotatably mounted on a front wheel drive output shaft 17, and a second driven gear 107 in mesh with the second output gear 74 is fixed to a clutch case 109 freely rotatably mounted on the front wheel drive output shaft 17. The first driven gear 102 and the clutch case 109 are interposed by a shift element 104 splined to the front wheel drive output shaft 101 to be rotatable in unison and axially slidable thereon. The shift element 104 acts also as piston for a multidisk friction clutch 108. The shift element 104 defines engaging claws 105 opposed to the first driven gear 102 and a piston portion 106 opposed to the second driven gear 107. Thus, the multidisk friction clutch 108 is provided between the shift element 104 and the clutch case 109 and a claw clutch 110 is provided between the shift element 104 and the first driven gear 102. The friction clutch 108 is employed at an accelerating four wheel drive side in order to prevent shocks and gear noises occurring at times of stopping an accelerating four wheel drive mode. The entire front wheel change speed mechanism is covered by a case 111.

Figure 9A:
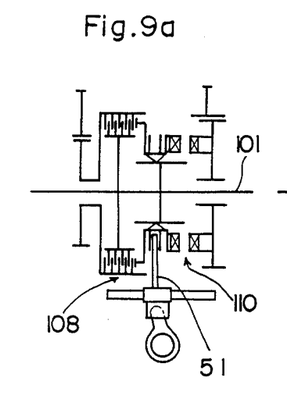
FIG. 9a is a schematic plan view showing a position for shifting the front wheel change speed mechanism to provide a front wheel accelerating four wheel drive mode.
Figure 9B:
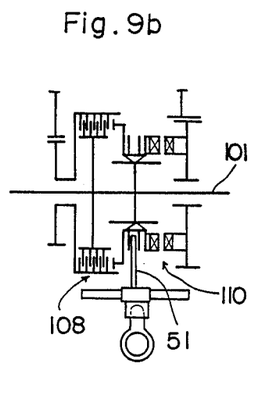
FIG. 9b is a schematic plan view showing a position for shifting the front wheel change speed mechanism to neutral.
Figure 9C:
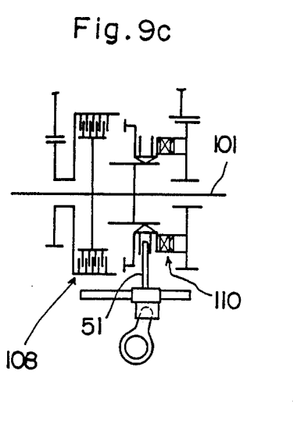
FIG. 9c is a schematic plan view showing a position for shifting the front wheel change speed mechanism to provide a standard four wheel drive mode.

The first output gear 73 and the first driven gear 102 have a gear ratio to substantially equalize a peripheral speed of the front wheels 1 effected through the first output gear 73, first driven gear 102 and claw clutch 110 to a peripheral speed of the rear wheels 2. The second output gear 74 and the second driven gear 107 have a gear ratio to make a peripheral speed of the front wheels 1 effected through the second output gear 74, second driven gear 107 and friction clutch 108 greater than, for example twice, the peripheral speed of the rear wheels 2. Thus, the tractor is driven by a front wheel accelerating four wheel drive mode when the friction clutch 108 is engaged as shown in FIG. 9a, and by a standard four wheel drive mode with the front and rear wheels driven at a substantially equal peripheral speed when the claw clutch 110 is engaged as shown in FIG. 9c. FIG. 9b shows the shift element 104 in neutral position, in which state the tractor is driven by a two wheel drive mode with the front wheels 1 disconnected from the power transmission.

Figure 4:
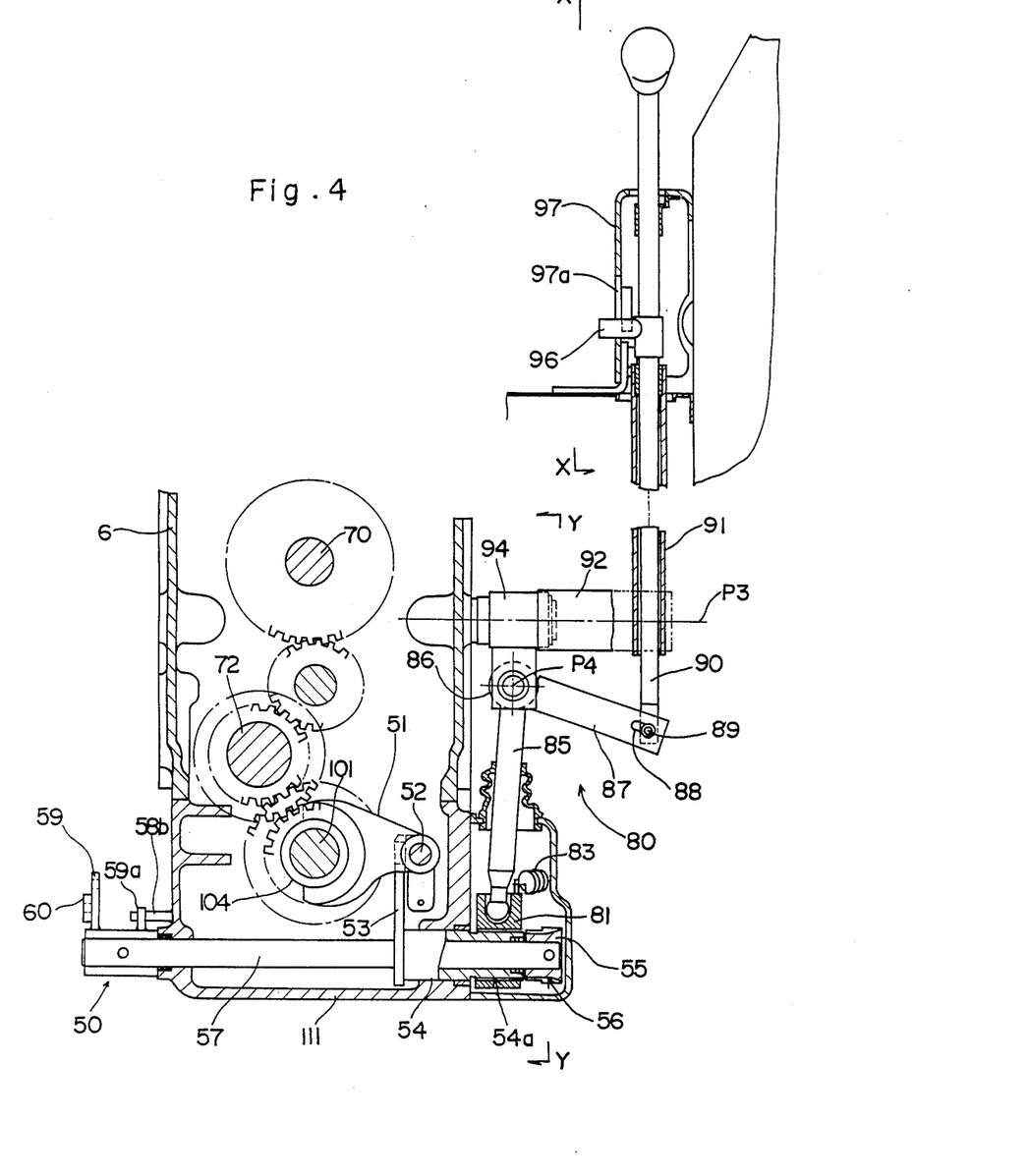
FIG. 4 is a front view of control means for the front wheel change speed mechanism.

Referring to FIG. 4, the shift element 104 is operated by a shifter 57 mounted on a support shaft 52 to be movable along the front wheel drive output shaft 101. This shifter 57 is axially movable by a control element 54 freely rotatably mounted on a control shaft 57 disposed below and extending perpendicular to the front wheel drive output shaft 101. The control element 54 includes a boss defining splines 54a at an end thereof. The control shaft 57 carries a collar 55 at an end thereof adjacent to the end of the boss of the control element 54. The collar 55 is rotatable in unison with the control shaft 57 and defines splines 56 equal in shape to the splines 54a. A switching element 81 is slidably mounted on the splines 54a and 56. When the switching element 81 connects the control element 54 and the control shaft 57 to be rotatable in unison, the shift element 104 of the front wheel change speed mechanism becomes operable by the control shaft 57. The splines 56 on the collar 55 comprise tapered teeth to be smoothly engageable by the switching element 81.

The control shaft 57 is connected at the other end thereof to a control lever 59 carrying an arm 60 to which a return spring 61 is attached (FIG. 5a) to urge the control shaft 57 to a position to provide the standard four wheel drive mode. A stopper 58a and a roll pin 58b serve to return the control shaft 57 to the position to provide the standard four wheel drive mode. As particularly described hereinafter, the control lever 59 is operatively connected to a pitman arm 68 whereby variations in the front wheel steering angle are transmitted to the control lever 59 as one of the factors indicating traveling conditions.

Figures 5A, 5B:
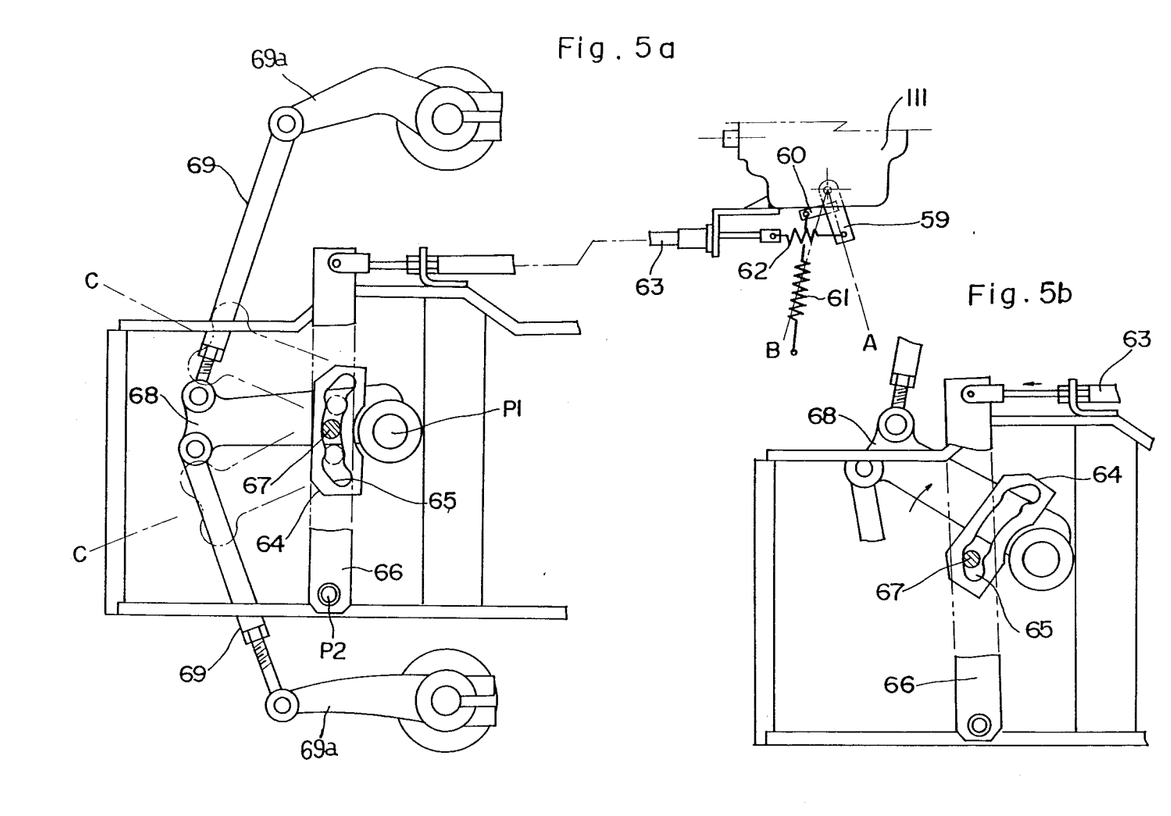
FIG. 5a is a view showing an interlocking arrangement between a pitman arm and the front wheel change speed mechanism.
FIG. 5b is a view showing the pitman arm displaced beyond a predetermined angle.
Figure 6:
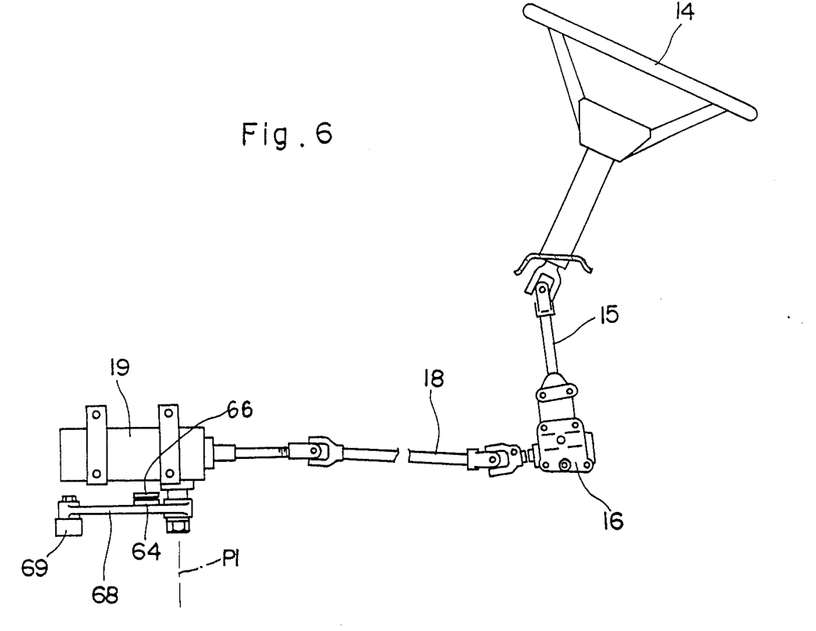
FIG. 6 is a side view of a steering system extending from a steering wheel to the pitman arm.

A front wheel steering system will be described first with reference to FIGS. 5 and 6. An output of a steering wheel 14 is transmitted through a steering shaft 15, a bevel gear mechanism 16 and a joint rod 18 to a steering gear mechanism 19. The output is doubled at the steering gear mechanism 19 for oscillating the pitman arm 68 connected to knucle arms 70 of the front wheels 1 through tie rods 69, on a vertical axis P1.

An interlocking structure between the pitman arm 68 and the control shaft 57 will be described next. As shown in FIG. 5a, a cam plate 64 is fixed to the pitman arm 68, and a cam arm 66 is provided to be oscillatable on a vertical axis P2 disposed sideways from the pitman arm 68. The cam arm 66 includes a pin 67 projecting downwardly from an intermediate position thereof into a cam opening 65 defined in the cam plate 64. A free end of the cam arm 66 is connected to the control lever 59 through a release wire 63 and a displacement adjusting spring 62.

The cam arm 66 is not operated by an oscillation of the pitman arm 68 up to a rightward or leftward position C. When the pitman arm 68 is oscillated rightward or leftward beyond the position C as shown in FIG. 5b, a camming action between the cam opening 65 of the cam plate 64 and the pin 67 of the cam arm 66 causes the cam arm 66 to draw the release wire 63, whereby the control lever 59 of the control shaft 57 is moved to a position to provide the front wheel accelerating drive mode. In other words, an output of the pitman arm 68 constituting traveling condition detecting means is transmitted to the control shaft 57 constituting a first control means 50 for the front wheel change speed mechanism 10, and finally to the shifter 51 thereby to switch the wheel drive modes. This first control means 50 functions to switch between the front wheel accelerating four wheel drive mode and the standard four wheel drive mode.

Figure 7:
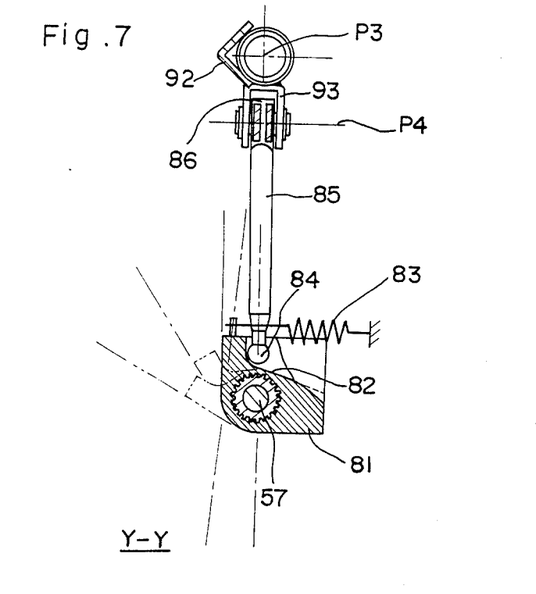
FIG. 7 is a sectional view taken on line Y—Y in FIG. 4.

A second control means 80 will particularly be described hereinafter with reference to FIGS. 4, 7 and 8. The second control means 80 is operable to establish and break the connection between the control shaft 57 of the first control means 50 and the control element 54 for sliding the shifter 51 for the front wheel change speed mechanism 10. The transmission case 6 supports on a lateral wall thereof a pivot shaft 95 extending transversely of the tractor. The pivot shaft 95 includes a boss 94 oscillatable on an axis P3 thereof, and a U-shaped bracket 93 is attached to the boss 94 to extend normal thereto. The U-shaped bracket 93 carries at a free end thereof a control arm 85 including a boss 86 oscillatable on an axis P4 of a pin disposed longitudinally of the tractor. The control arm 85 has an extreme end thereof extending into an elongate groove 82 defined in a top portion of the switching element 81 whereby the control arm 85 is operatively connected to the switching element 81. A spring 83 is provided to urge the switching element 81 to the position A for providing the standard four wheel drive mode. The boss 86 of the control arm 85 carries a lever 87 fixed thereto and defining a slot 88 at an extreme end thereof to receive a pin 89 provided at a lower end of a control rod 90. The boss 94 further carries a connecting member 92 extending axially thereof. The connecting member 92 carries a sleeve shaft 91 at one end thereof, and the control rod 90 is fitted in the sleeve shaft 91. The control rod 90 has a top end extending to the driver's section 13 and carries a guide pin 96 in a region of the driver's section 13. The guide pin 96 extends into an L-shaped guide groove 97a defined in a cover 97 disposed in the driver's section 13. Number 98 denotes a retainer comprising a leaf spring for retaining the control rod 90 in operative positions. Number 99 denotes a switch for detecting the positions of the control rod 90.

An interlocking arrangement for the front wheel change speed mechanism 10, first control means 50 and second control means 80 will particularly be described next.

Figure 8:
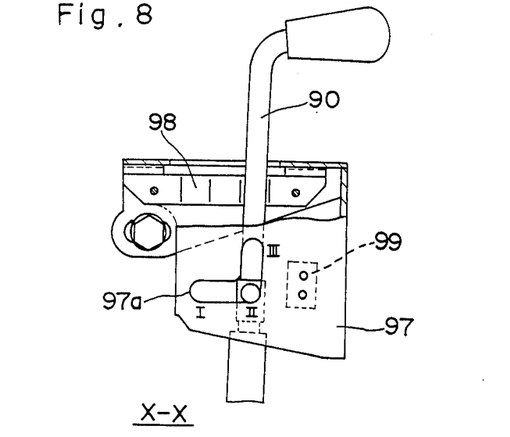
FIG. 8 is a sectional view taken on line X—X in FIG. 4.

When the control arm 85 is oscillated about the axis P4 by pulling the control rod 90 upwardly along the guide groove 97a to a position shown at III in FIG. 8, the switching element 81 comes into engagement with the splines 56 of the collar 55 to place the control shaft 57, and hence the pitman arm 68, in operative connection with the shift element 104 of the front wheel change speed mechanism 10 through the control element 54 and shifter 51. This state permits the front wheel change speed mechanism 10 to automatically switch to the front wheel accelerating drive mode with a displacement exceeding a predetermined amount of the pitman arm 68 which corresponding to the steering angle which constitutes one of the factors showing the travelling conditions. In other words, the upward movement of the control rod 90 along the guide groove 97a permits the first control means 50 to control the front wheel change speed mechanism 10.

When the control rod 90 is pushed downwardly along the guide groove 97a to a position shown at II in FIG. 8, causing the control arm 85 to oscillate clockwise about the axis P4, the switching element 81 disengages from the splines 56 of the collar 55 thereby breaking the operative connection between the control element 54 and the control shaft 57. Then, the displacement of the pitman arm 68 or rotation of the control shaft 57 is no longer transmitted to the front wheel change speed mechanism 10.

When the control rod 90 is oscillated about the axis P3 along the lower arm of the L-shaped guide groove 97a, the control 85 is oscillated in unison therewith and the control arm 85 and switching element 81, respectively, move to positions corresponding to a position indicated at I in FIG. 8. As a result, the shift element 104 of the front wheel change speed mechanism 10 moves to neutral position as shown in FIG. 9b whereby the tractor is driven by the two wheel drive mode.

When the second control means 80 is in the position to permit changeover between the standard four wheel drive mode and the front wheel accelerating four wheel drive mode, the switching element 81 and the collar 55 are connected to each other as noted above. Therefore, with a counterclockwise rotation of the control shaft 57 in FIG. 7 resulting from a displacement in a certain amount of the pitman arm 68, the switching element 81 and the control element 54 also rotate together to switch the wheel drive modes. At this time the control arm 85 of the second control means 80 does not interfere with the switching element 81 owing to the elongate groove 82 of the switching element 81.

As described, the second control means 80 has three operative positions; one corresponding to the two wheel drive mode, another corresponding to the standard four wheel drive mode, and the third position for permitting the first control means 50 to effect changeover between the standard four wheel drive mode and the front wheel accelerating four wheel drive mode. The first control means 50 is adapted to effect the changeover provided that the second control means 80 is in the position to permit the changeover.

For detecting the traveling conditions, depressions of side brake pedals may be employed in place of the displacement of the pitman arm. The side brake pedals are provided in a pair corresponding to the right and left wheels, and to enable the tractor to make a small sharp turn the wheel on the side to which the tractor turns is braked.

Figure 10:
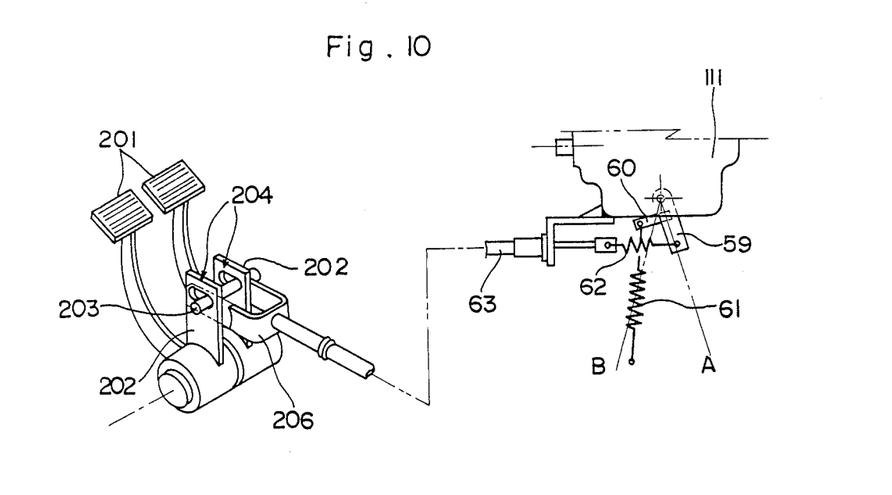
FIG. 10 is a view showing an interlocking arrangement between side brakes and the front wheel change speed mechanism.

An interlocking arrangement between the side brake pedals 201 and the control shaft 57 of the first control means 50 will be described with reference to FIG. 10. As seen, the side brake pedals 201 have support bosses from which lever arms 202 extend upwardly, respectively. The lever arms 202 define slots 204 through which a pin 203 extends. The pin 203 is supported at opposite ends thereof by a U-shaped member 206 operatively connected through a release wire 63 and a spring 62 to the lever 59 at the end of the control shaft 57. The control shaft 57 is urged by a spring 61 to the standard drive position, and the rotation beyond the standard drive position is prevented by a stopper 58a and a roll pin 58b.

What is claimed is:

1. A wheel drive mode changeover apparatus for a vehicle having at least a first wheel set and a second wheel set driven by an engine, comprising:

changeover means for effecting changeover between (a) a two wheel drive mode having only the second wheel set driven, (b) a first four wheel drive mode having the first wheel set and the second wheel set driven at a substantially equal peripheral speed, and (c) a second four wheel drive mode with the first wheel set driven at a higher peripheral speed than the second wheel set, said changeover means including first transmission means for effecting said first four wheel drive mode, second transmission means for effecting said second four wheel drive mode, a claw clutch for coupling and uncoupling said first wheel set with said first transmission means, a friction clutch for coupling and uncoupling said first wheel set with said second transmission mechanism, and shifting means for selectively shifting said claw clutch and said friction clutch;

traveling condition detecting means including means for generating an output indicative of traveling conditions;

first control means operatively coupled to said traveling condition detecting means and responsive to said output of said traveling condition detecting means for actuating said changeover means, said first control means including means for switching between said first four wheel drive mode and said second four wheel drive mode; and second control means for establishing and breaking operative connection between said changeover means and said first control means.

2. A wheel drive mode changeover apparatus as claimed in claim 1 wherein the vehicle includes a right and a left side brake pedal operatively coupled to said second wheel set, and wherein said traveling condition detecting means includes interlocking means for providing said first control means with a kinematic output in response to depression of only one of the right and left side brake pedals 3. A wheel drive mode changeover apparatus as claimed in claim 1 wherein the vehicle includes a pitman arm for steering the first wheel set and wherein said traveling condition detecting means includes interlocking means for providing said first control means with a kinematic output in response to displacement of the pitman arm.

4. A wheel drive mode changeover apparatus for a vehicle including at least a first wheel set and a second wheel set driven by an engine, comprising:

changeover means for effecting changeover between (a) a two wheel drive mode having only the second wheel set driven, (b) a first four wheel drive mode having the first wheel set and the second wheel set driven at substantially the same peripheral speed, (c) a second four wheel drive mode with the first wheel set driven at a higher peripheral speed than the second wheel set, said changeover means including first transmission means for effecting said first four wheel drive mode, second transmission means for effecting said second four wheel drive mode, a claw clutch for coupling and uncoupling said first wheel set with said first transmission means, a friction clutch for coupling and uncoupling said first wheel set with said second transmission means, and shifting means for selectively shifting said claw clutch and said friction clutch;

traveling condition detecting means for generating an output indicative of traveling conditions;

first control means operatively coupled to said traveling condition detecting means and responsive to an output of said traveling condition detecting means for actuating said changeover means, said first control means including means for switching between said first four wheel drive mode and said second four wheel drive mode; and a second control means for actuating said transmission means to switch between said two wheel drive mode and said first four wheel drive mode and for establishing and braking operative connection between said changeover means and said first control means.

5. A wheel drive mode changeover apparatus as claimed in claim 4, wherein said second control means has three operative positions including a first operative position for causing said changeover means to provide the two wheel drive mode and prohibit action of said first control means, a second operative position for causing said changeover means to provide the first four wheel drive mode and prohibit action of said first control means, and a third operative position for causing said changeover means to provide the first four wheel drive mode and permit action of said first control means.

6. A wheel drive mode changeover apparatus as claimed in claim 5 wherein the vehicle includes a right and a left side brake pedal operatively coupled to said second wheel set, and wherein said traveling condition detecting means includes interlocking means for providing said first control means with a kinematic output in response to depression of only one of said right and left side brake pedals 7. A wheel drive changeover apparatus as claim 6 wherein the vehicle includes a pitman arm for steering said first wheel set and wherein said traveling condition detecting means includes interlocking means for providing said first control means with a kinematic output in response to displacement of the pitman arm.

* * * * *